United States Patent [19]

Iida

[11] Patent Number: 5,758,292
[45] Date of Patent: May 26, 1998

[54] TELEPHONE AND CORDLESS TELEPHONE CAPABLE OF SUPPRESSING SPURIOUS INTERFERENCE

[75] Inventor: Hiroshi Iida, Kanagawa, Japan

[73] Assignee: Sony Corporation, Tokyo, Japan

[21] Appl. No.: 533,089

[22] Filed: Sep. 25, 1995

[30] Foreign Application Priority Data

Sep. 30, 1994 [JP] Japan .................... 6-261121

[51] Int. Cl.$^6$ ..................................... H04Q 7/00
[52] U.S. Cl. .................... 455/550; 455/556; 455/501; 379/421; 379/434
[58] Field of Search ................... 379/61, 62, 110, 379/102, 434, 58, 59, 421; 455/88, 89, 33.1, 74, 82, 90, 35.1, 194.1, 344, 450, 462, 556, 562, 464, 501, 509, 513, 516, 421, 429

[56] References Cited

U.S. PATENT DOCUMENTS

| | | | |
|---|---|---|---|
| D. 366,873 | 2/1996 | Nakayama | D14/144 |
| 3,868,571 | 2/1975 | Greiner | 455/88 |
| 4,524,461 | 6/1985 | Kostanty et al. | 455/88 |
| 4,650,928 | 3/1987 | Numata | 379/62 |
| 4,694,485 | 9/1987 | Iwase | 455/464 |
| 4,783,844 | 11/1988 | Higashiyama et al. | 455/455 |
| 4,873,712 | 10/1989 | Porco | 379/58 |
| 5,056,153 | 10/1991 | Taniguchi et al. | 455/89 |
| 5,095,503 | 3/1992 | Kowalski | 455/563 |
| 5,128,987 | 7/1992 | McDonough et al. | 379/102 |
| 5,233,646 | 8/1993 | Kuromi | 379/110 |
| 5,243,640 | 9/1993 | Hadley et al. | 379/421 |
| 5,420,907 | 5/1995 | Shapiro | 379/110 |
| 5,537,673 | 7/1996 | Nagashima et al. | 455/89 |
| 5,542,102 | 7/1996 | Smith et al. | 455/88 |

Primary Examiner—Dwayne Bost
Assistant Examiner—Tracy M. Legree
Attorney, Agent, or Firm—Jay H. Maioli

[57] ABSTRACT

A cordless telephone includes at least one child unit and a mother unit. The mother unit transmits and receives a radio signal to and from the child unit. The mother unit includes first and second receiver circuits, a transmitter circuit, and a muting circuit. The first receiver circuit receives an UP-channel signal from the child unit and transmits the received signal to a telephone line. The transmitter circuit receives the signal transmitted via the telephone line from the counter party, and converts the signal received from the counter party into a DOWN-channel signal which will then be transmitted to the child unit. The second receiver circuit receives a broadcasting radio signal. The muting circuit mutes the output signal from the second receiver circuit. The muting circuit mutes the output signal derived from the second receiver circuit when either the UP-channel signal, or the DOWN-channel signal may give spurious interference to the second receiver circuit.

7 Claims, 5 Drawing Sheets

Fig.2

| CHANNEL | MOTHER UNIT | | CHILD UNIT | |
|---|---|---|---|---|
| | TRANS-MITTING FREQUENCY | SPURIOUS FREQUENCY (SECOND HIGHER HARMONIC) | TRANS-MITTING FREQUENCY | SPURIOUS FREQUENCY (SECOND HIGHER HARMONIC) |
| 1 | 46.610 | 93.220 | 49.670 | 99.340 |
| 2 | 46.630 | 93.260 | 49.845 | 99.690 |
| 3 | 46.670 | 93.340 | 49.860 | 99.720 |
| 4 | 46.710 | 93.420 | 49.770 | 99.540 |
| 5 | 46.730 | 93.460 | 49.875 | 99.750 |
| 6 | 46.770 | 93.540 | 49.830 | 99.660 |
| 7 | 46.830 | 93.660 | 49.890 | 99.780 |
| 8 | 46.870 | 93.740 | 49.930 | 99.860 |
| 9 | 46.930 | 93.860 | 49.990 | 99.980 |
| 10 | 46.970 | 93.940 | 49.970 | 99.940 |

UNIT [MHz]

<u>100</u>
CALL RECEIVING ROUTINE

<u>110</u>
CALLING ROUTINE

TELEPHONE AND CORDLESS TELEPHONE CAPABLE OF SUPPRESSING SPURIOUS INTERFERENCE

BACKGROUND OF THE INVENTION

1. Field of the invention

The present invention generally relates to a telephone and a cordless telephone. More specifically, the present invention is directed to a telephone and cordless telephone containing a tuner.

2. Description of the Related Art

A cordless telephone containing a radio receiver is suitable when the cordless telephone is located beside a bed during operation.

In FIG. 1, there is shown an example of such a cordless telephone equipped with a radio receiver. FIG. 1 represents such a condition that a child unit 2 is located at a recharging position when a mother unit 1 recharges a secondary cell employed within the child unit 2.

The mother unit 1 includes a telescopic type antenna 11, a speaker 15, a tuning knob 16, a dialing frequency display unit 17, and various sorts of operation keys 18. In this case, the antenna 11 has two functions, namely a transmission/reception antenna as a cordless telephone, and an FM signal reception antenna for the radio receiver. The speaker 15, the tuning knob 16, the display unit 17 and the keys 18 are used to receive the radio broadcasting program and listen thereto. It should be noted that the broadcasting channel reception bands are prepared for the AM broadcasting band of 530 KHz to 1610 KHz and the FM broadcasting band of 87.6 MHz to 108 MHz in U.S.A.

In the cordless telephone shown in FIG. 1, the mother unit 1 only has the function to connect the child unit 2 to a telephone line (not shown) as the cordless telephone. As a consequence, the operation keys 18 are arranged only by such keys used to control operations of the mother unit as a receiver, for instance, ON/OFF of a power supply, ON/OFF of a sleep function, and ON/OFF of an alarm function.

Although not shown in this drawing, the child unit 2 is further equipped with a microphone functioning as a transmitter device, a speaker functioning as a receiver device; an extension line key and a transmitter/receiver circuit thereof for issuing/receiving a telephone call, and a dial key.

As a consequence, such a cordless telephone is very convenient when the cordless telephone is operable as the radio receiver and also operable with satisfying the cordless telephone's features, for example, located beside a bed in a bed room.

In general, low-power cordless telephones designed to the Japanese market and cordless telephones designed to the US market have different channel frequencies used between mother units and child units, and carrier frequencies of FM signals transmitted/received between the mother units and the child units, namely represented in a list of FIG. 2. The frequencies of second higher harmonics are also listed in FIG. 2.

Accordingly, the second higher harmonics of the carrier frequencies are located within the broadcasting frequency bands of the FM broadcasting channels as represented in FIG. 2. When a telephone communication is established between a mother unit and a child unit by receiving a telephone call, while listening to an FM broadcasting program, the reception frequency of the FM broadcasting program would be coincident with, or closed to the second harmonic frequency of the carrier frequency used between the mother unit and the child unit. As a result, any interference, namely spurious interference would be given to the reception of the FM broadcasting program, and therefore unpleasant sounds are reproduced from the speaker 15.

SUMMARY OF THE INVENTION

It is therefore an object of the present invention to provide a telephone capable of solving the above-mentioned problems.

It is another object of the present invention to provide a cordless telephone capable of solving the above-described problems.

According to one aspect of the present invention, there is provided a telephone including at least one child unit and a mother unit. The mother unit transmits and receives a radio signal to and from the child unit, respectively. The mother unit includes a first and second transmitter/receiver unit, a receiver unit, and a muting unit. The first transmitter/receiver unit receives an UP-channel signal from the child unit and transmits the received signal to a telephone line. The second transmitter/receiver unit receives the signal transmitted via the telephone line from the counter party, and converts the signal received from the counter party into a DOWN-channel signal which will then be transmitted to the child unit. The receiver unit receives a broadcasting radio signal. The muting unit mutes the output signal from the receiver unit. The muting unit mutes the output signal derived from the receiver unit when either the UP-channel signal, or the DOWN-channel signal may give spurious interference to the receiver unit.

According to another aspect of the present invention, there is provided a cordless telephone including at least one child unit and a mother unit. The mother unit transmits and receives a radio signal to and from the child unit, respectively. The mother unit includes a transmitter/receiver unit, a tuner unit, a muting unit, and a control unit. The transmitter/receiver unit transmits and receives a signal with the child unit. The tuner unit is capable of receiving at least an FM broadcasting channel. The muting unit mutes the output signal from the tuner unit. The control unit controls the muting unit so as to mute the output signal from the tuner unit when the tuner unit is under FM broadcasting program reception condition and the transmitter/receiver unit transmits and receives the signal.

BRIEF DESCRIPTION OF THE DRAWINGS

FIG. 2 shows a relationship between spurious frequencies and channels used between a mother unit and a child unit;

FIG. 5A is a flow chart for describing a call receiving process, and FIG. 5B is a flow chart for describing a call issuing process.

DETAILED DESCRIPTION OF THE PREFERRED EMBODIMENTS

Figure 1:
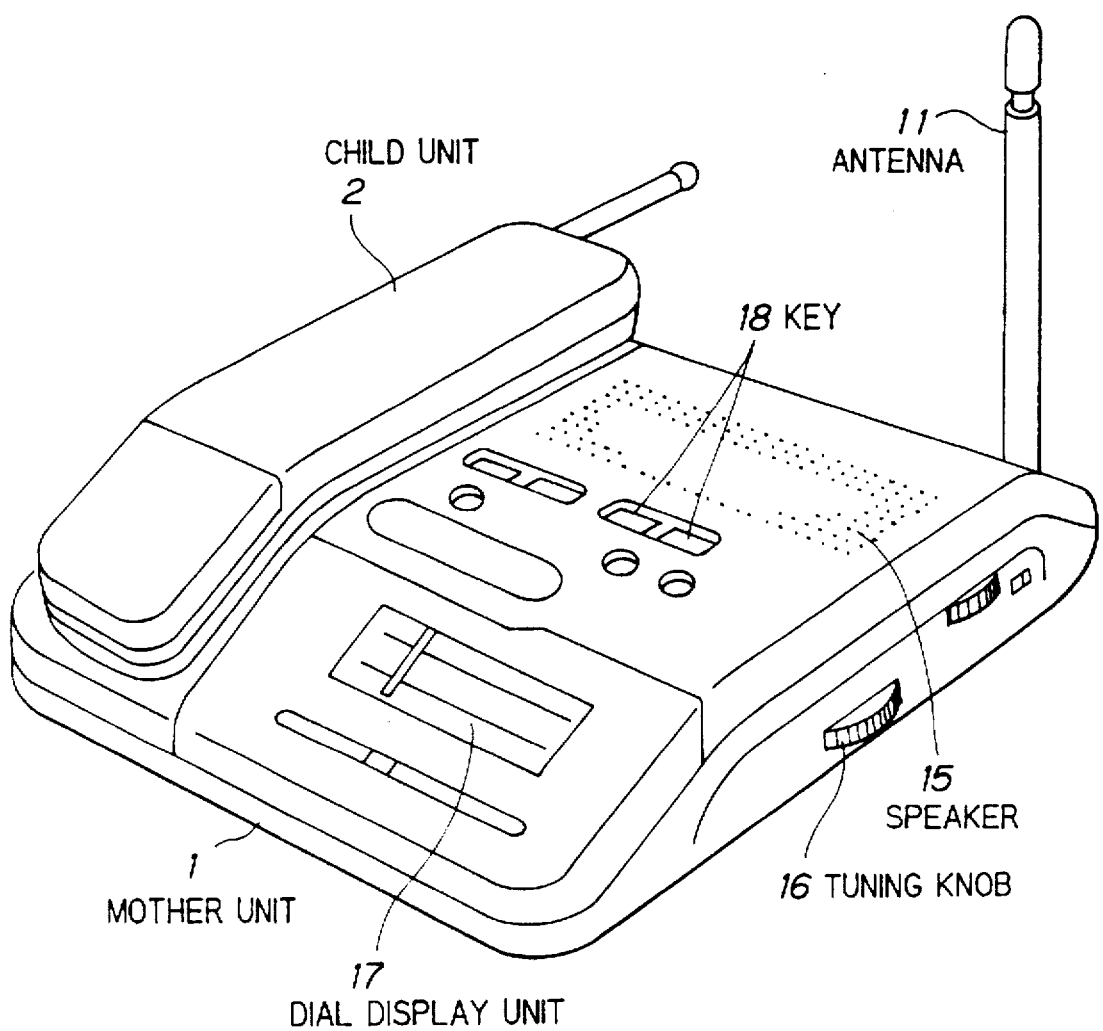
FIG. 1 is a perspective view for showing an example of a structure of a cordless telephone.

Referring now to the drawings, a telephone according to a preferred embodiment of the present invention will be described in detail. It should be noted that the below-mentioned telephone is a so-called "cordless telephone" as shown in FIG. 1, mainly constructed of a mother unit 1 and a child unit 2. A tuner is built in this mother unit 1.

First, a description is made of a cordless telephone according to a first embodiment of the present invention.

Figure 3:
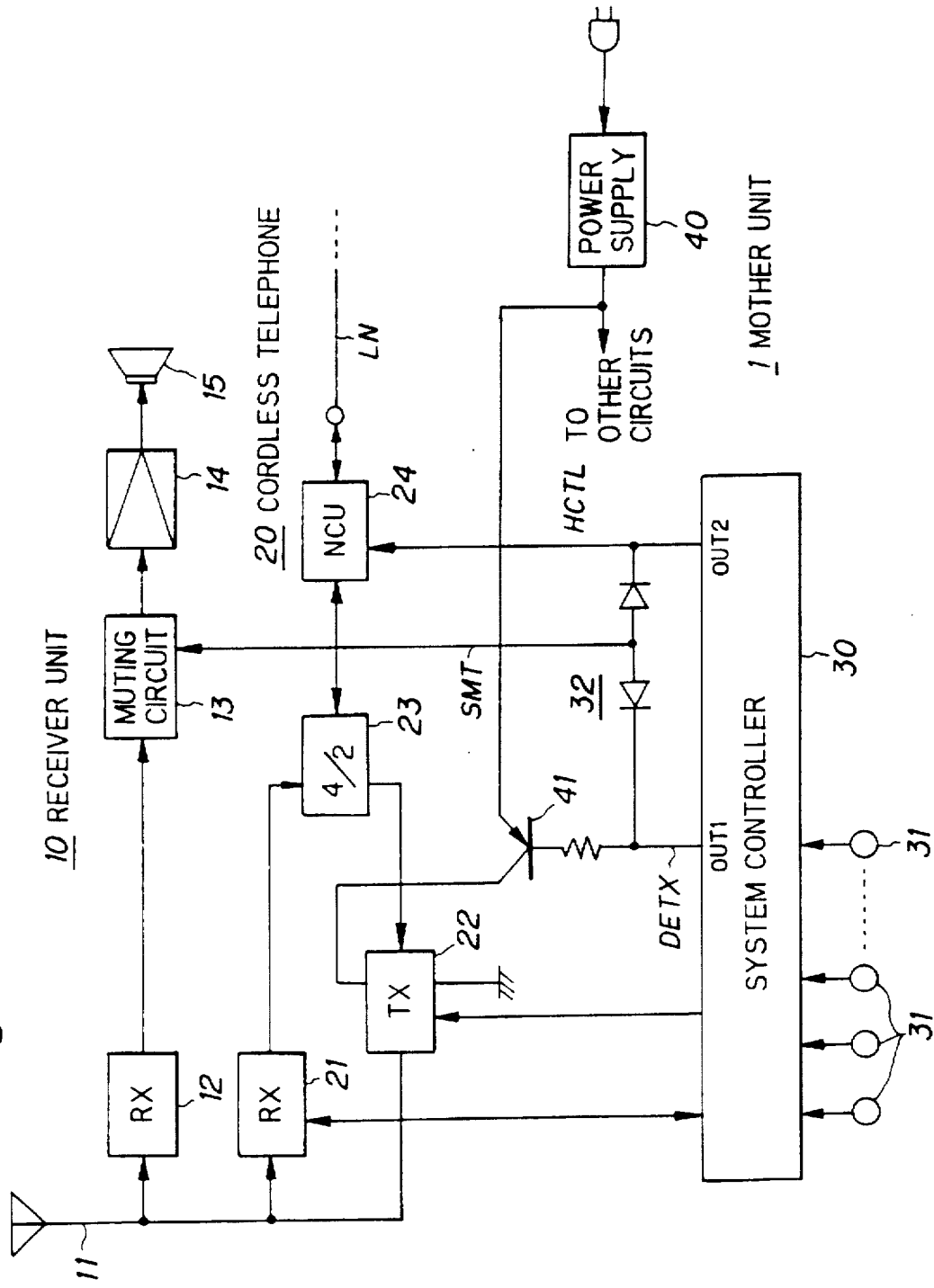
FIG. 3 is a schematic block diagram for indicating an arrangement of a cordless telephone according to a first embodiment of the present invention.

FIG. 3 is a schematic block diagram for indicating an arrangement of the mother unit 1 of the cordless telephone according to the first embodiment of the present invention. It should also be noted that the same reference numerals shown in FIG. 1 will be employed as those for indicating the same or similar circuit elements represented in FIG. 3, and detailed explanations thereof are omitted. In FIG. 3, the mother unit 1 is equipped with a radio receiver unit 10, a cordless telephone unit 20, a controller 30 for controlling the telephone system, and a power supply circuit 40.

The radio receiver unit 10 includes an FM/AM broadcasting receiver circuit 12 arranged in the superheterodyne system. In this embodiment of FIG. 3, the receiver unit 11 selects an FM broadcasting channel band and an AM broadcasting channel band by using a band select switch (not shown in detail), and also performs a tuning operation by way of a so-termed "variable capacitor".

When either an FM broadcasting signal, or an AM broadcasting signal is received, a broadcasting signal transmitted from a broadcasting station via a repeating station is received by an antenna 11 to be supplied to a receiver circuit 12. Then, a desired broadcasting signal is selected by manipulating the tuning knob 17 shown in FIG. 1, and an audio signal is demodulated from this selected (tuned) broadcasting signal. The audio signal demodulated by the receiver circuit 12 is supplied via a muting circuit 13 and a low frequency amplifier 14 to a speaker 15. An audible sound is produced from the speaker in response to the demodulated audio signal.

The cordless telephone unit 20 is constructed of a receiver unit 21 arranged in the superheterodyne system, a transmitter circuit 22, a 4-line/2-line converting circuit 23, and an NCU24 for capturing/releasing the line.

When this telephone is used as the cordless telephone, the UP-channel FM signal transmitted from the child unit 2 is received by the antenna 11 and supplied to the receiver circuit 21. The voice signal from the child unit 2 is derived from this receiver circuit 21. The voice signal derived from the receiver circuit 21 is sent out via the 4-line/2-line converting circuit 23 to the telephone line "LN". Also, the data derived from the receiver circuit 21 is furnished to the system controller 30 arranged by a microcomputer.

Furthermore, another voice signal transmitted from a counter party via the telephone line is supplied through the NCU 24 and the converting circuit 23 to the transmitter circuit 22 so as to be converted into a DOWN-channel FM signal. The FM signal derived from this transmitter circuit 22 is supplied to the antenna 11 in order to be transmitted to the child unit 2. Thus, the telephone user of the child unit 2 can make a telephone conversation with the counter party via the mother unit 1.

Output data of an operation key 31 is supplied to the system controller 30, and data for setting a channel to be used is supplied from this system controller 30 to the receiver circuit 21 and the transmitter circuit 22.

In the power supply circuit 40, the commercial AC voltage is converted into a predetermined DC voltage. This converted DC voltage is applied to the respective circuits except for the transmitter circuit 22 as operation voltages thereof. An emitter-to-collector path of a switching transistor 41 is series-connected between the output terminal of this power supply circuit 40 and the power supply line of the transmitter circuit 22. From a first output port OUT1 of the system controller 30, such a transmission control signal DETX is derived that this transmission control signal becomes an "L" level during transmission of the DOWN-channel FM signal such as during telephone conversation, whereas this transmission control signal becomes an "H" level during no transmission. This transmission control signal DETX is supplied to the base of the switching transistor 41.

Also, from a second output port OUT2 of the system controller 30, such a control signal HCTL is derived that this control signal becomes an "L" level during off-hook state and becomes an "H" level during on-hook state. This control signal HCTL is furnished to the NCU 24.

Furthermore, both of the signals DETX and HCTL derived from the system controller 30 are supplied to an AND (gate) circuit 32 constructed of diodes. An output signal SMT from the AND circuit 32 is supplied to the muting circuit 13 as a control signal thereof. When the output signal SMT is equal to an "L" level, the muting operation by the muting circuit 13 is turned ON.

With the above-described circuit arrangement, when a telephone call is made in the waiting mode, the transmission control signal DETX becomes an "L" level in order to notify the telephone call to the child unit 2. Since the transmission control signal DETX becomes the "L" level, the switching transistor 41 is turned ON, so that the power is supplied to the transmitter circuit 22 and therefore, the transmission of the DOWN-channel FM signal is allowed. Subsequently, a predetermined protocol is executed between the mother unit 1 and the child unit 2. When the child unit 2 is connected via the channel to the mother unit 1, the control signal HCTL becomes the "L" level so that the NCU 24 is brought into the on-hook state. Accordingly, the telephone user of this child unit 1 can establish the telephone conversation with the counter party.

On the other hand, when a telephone call is issued in the waiting mode and the telephone call is transmitted as the UP-channel FM signal, since the receiver circuit 21 is continuously energized so as to monitor the call demand issued from the child unit 1, the transmission control signal DETX becomes the "L" level in response to this call issue demand. As a consequence, the transmission of the DOWN-channel FM signal from the transmitter circuit 22 is allowed, and a preselected protocol is executed between the mother unit 1 and the child unit 2, so that the child unit 2 is connected via the channel to the mother unit 1 and furthermore, the control signal HCTL becomes the L level to bring the NCU 24 into the off-hook state in a similar manner to the call receiving operation. Therefore, when the user of the child unit 2 dials the telephone number of the counter party, the dialing signal corresponding to the telephone number is sent from the mother unit 1 to the telephone line LN. When the counter party hooks up a telephone in response to this dialing signal, this counter party can make a telephone conversation with the telephone caller.

Furthermore, when the telephone conversation is ended and then the end of the telephone conversation is entered by manipulating the key of the child unit 2, the entered data is sent to the mother unit 1, so that the transmission control signal DETX becomes the H level and then the switching transistor 41 is turned OFF. As a consequence, the signal transmission by the transmitter circuit 22 is prohibited. Then, the mother unit 1 is brought into the waiting mode.

In the case that the above-described telephone calling operation, telephone call receiving operation, or telephone conversation is carried out, even when the FM broadcasting signal is received by the receiver unit 10, the transmission control signal DETX becomes the "L" level. Thus, when the signal transmission by the transmitter circuit 22 is allowed, the transmission control signal DETX becomes the "L" level. As a result, SMT="L" and the muting operation by the muting circuit 13 is turned ON.

Otherwise, when the control signal HCTL becomes the "L" level to bring the NCU 24 into the off-hook state, SMT="L" and the muting operation by the muting circuit 13 is also turned ON.

As a consequence, even when spurious interference is given to the receiver circuit 10 due to spurious waves of the DOWN-channel FM signal and also the UP-channel FM signal, at this time, this receiver unit 10 never outputs spurious noise sounds from the speaker 15, caused by the above-described spurious waves, since the output signal from the receiver circuit 12 is muted by the muting circuit 13.

In such a case that the cordless telephone is used beside a bed, the child unit 2 is utilized near the mother unit 1. Since the output signal from the receiver unit 10 is muted during the telephone conversation, there is no such difficulty that the speaker 15 reproduces voice in response to the output signal from the receiver unit 10 to disturb the telephone communication. Furthermore, another muting circuit for preventing limiter noise among FM broadcasting stations may be commonly used, resulting in low cost.

Next, a cordless telephone according to a second embodiment of the present invention will now be explained with reference to FIG. 4 and FIG. 5. It should be noted that the same reference numerals shown in FIG. 1 and FIG. 3 will be employed as those for denoting the same of similar circuit components of FIG. 4.

Figure 4:
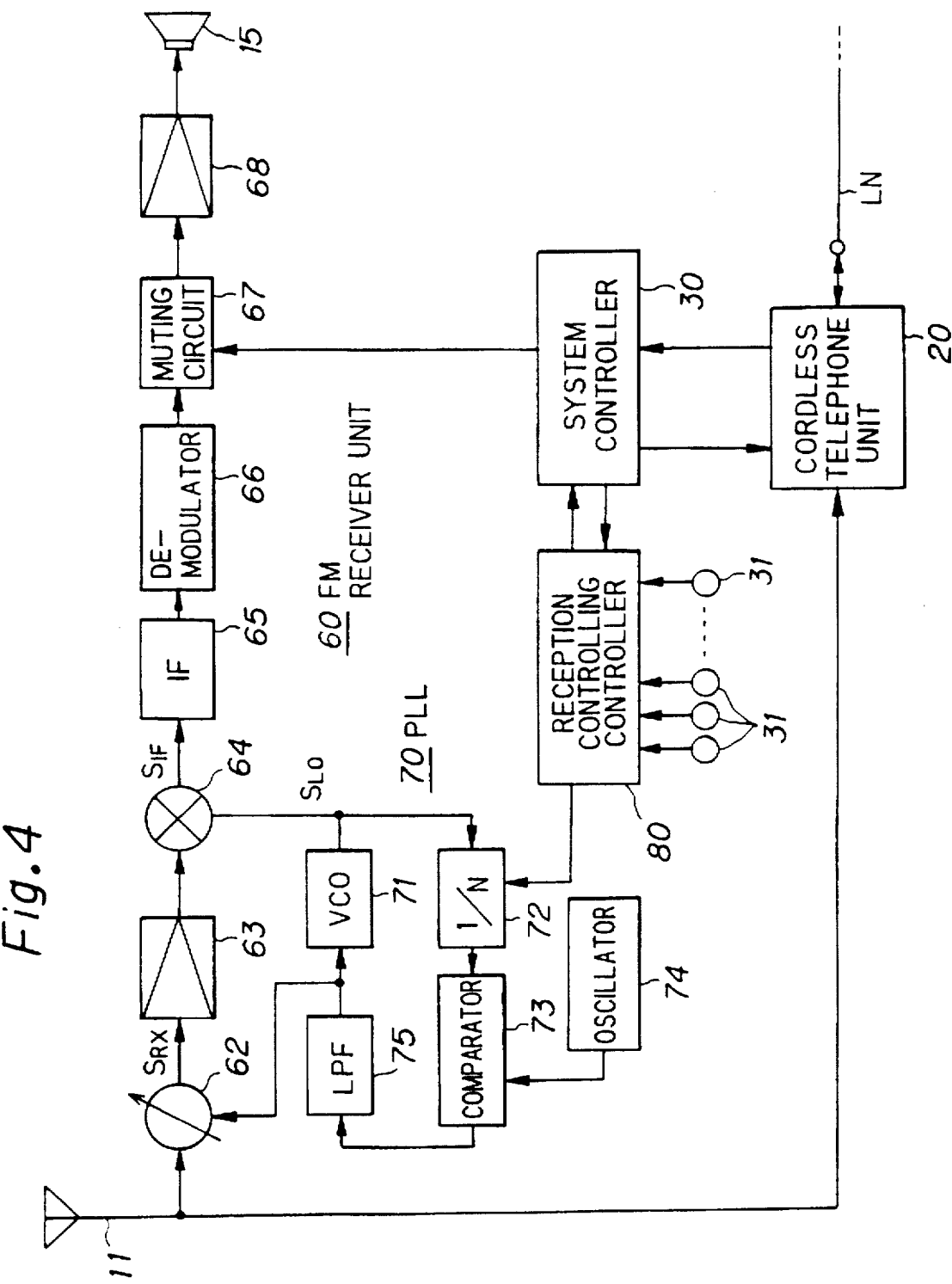
FIG. 4 is a schematic block diagram for indicating an arrangement of a cordless telephone according to a second embodiment of the present invention.

The cordless telephone according to the second embodiment indicated in FIG. 4 is so arranged that a receiver unit 10 is constructed of the synthesizer system, and when a channel is opened between the cordless telephone and a child unit 1, a channel selection is made in such a manner that no spurious interference is given to a reception of an FM broadcasting signal.

That is, in FIG. 4, in a synthesizer type FM receiver unit 60, an FM broadcasting signal received by an antenna 11 is supplied to an electronic tuning type antenna tuning circuit 62 to derive a broadcasting signal "$S_{RX}$" having a desired frequency "$f_{RX}$".

The broadcasting signal "$S_{RX}$" is supplied through a high frequency amplifier 63 to a mixer circuit 64, and also an oscillator signal "$S_{LO}$" having a frequency "$f_{LO}$" is derived from a VCO (voltage controlled oscillator) 71. This frequency "$f_{LO}$" is defined by, for instance, $$f_{LO} = f_{RX} + f_{IF} \ [KHZ] \qquad (1)$$

where symbol "$f_{IF}$" indicates an intermediate frequency, e.g., $f_{IF}$=10.7 MHz. Then, this signal "$S_{LO}$" is furnished to a mixer circuit 64 as a local oscillator signal, so that the broadcasting signal "$S_{RX}$" is frequency-converted into the intermediate frequency signal "$S_{IF}$" (having intermediate frequency "$f_{IF}$").

Furthermore, this intermediate frequency signal "$S_{IF}$" is supplied via an intermediate frequency amplifier 65 to an FM demodulator circuit 66 so as to be modulated as an audio signal. Then, the demodulated audio signal is supplied via a muting circuit 67 and an amplifier 68 to a speaker 15. The demodulated audio signal is outputted as audible sound from the speaker 15.

At this time, the VCD 71 constitutes a PLL (phase-locked loop) 70 in combination of circuits 72 to 75. That is, a signal "$S_{LD}$" derived from the VCO 71 is supplied to a variable frequency circuit 72 by which the frequency of this signal $S_{LD}$ is divided in a ratio of 1/N. The frequency-divided signal from the variable frequency circuit 72 is supplied to a phase comparator circuit 73, and also an oscillator signal having a reference frequency, e.g., 100 KHz is outputted from the oscillator circuit 74. The oscillator signal having the reference frequency from the oscillator circuit 74 is furnished to the phase comparator circuit 73 which phase-compares the frequency-divided signal from the variable frequency circuit 72 with the output signal from the oscillator circuit 74. The comparison output is applied as a control voltage via a low-pass filter 75 to the VCO 71. An output voltage from the filter 75 is applied as a tuning (channel selection) voltage to the tuning circuit 62.

As a consequence, since the frequency of the frequency-divided signal from the frequency dividing circuit 72 is equal to the frequency of the oscillator signal from the oscillator circuit 74, a frequency "$f_{LD}$" of the oscillator signal "$S_{LD}$" at this time is given as follows:

$$f_{LD} = N \times 100 \ [KHz] \qquad (2)$$

Based upon the above-described equations (1) and (2), a reception frequency "$f_{RX}$" is expressed by:

$$f_{RX} = f_{LD} + f_{IF} \qquad (3)$$
$$= N \times 0.1 + 10.7 \ \text{MHz}.$$

Accordingly, when the frequency dividing ratio N is successively changed by 1 between 983 and 1187, the local oscillator frequency "$f_{LD}$" is varied in the frequency step of 100 KHz between 98.3 MHz and 118.7 MHz, so that the reception frequency $f_{RX}$ is changed in the frequency step of 100 KHZ between 87.6 MHz and 108 MHz and in correspondence with the frequency dividing ratio N.

A reception controlling controller 80 arranged by a microcomputer supplies the data about the frequency dividing ratio N to the frequency dividing circuit 72. From the system controller 30, a muting control signal is supplied to a muting circuit 67. The respective operation signals from the plural operation keys 31 are furnished to the reception controlling controller 80.

Figure 5A:
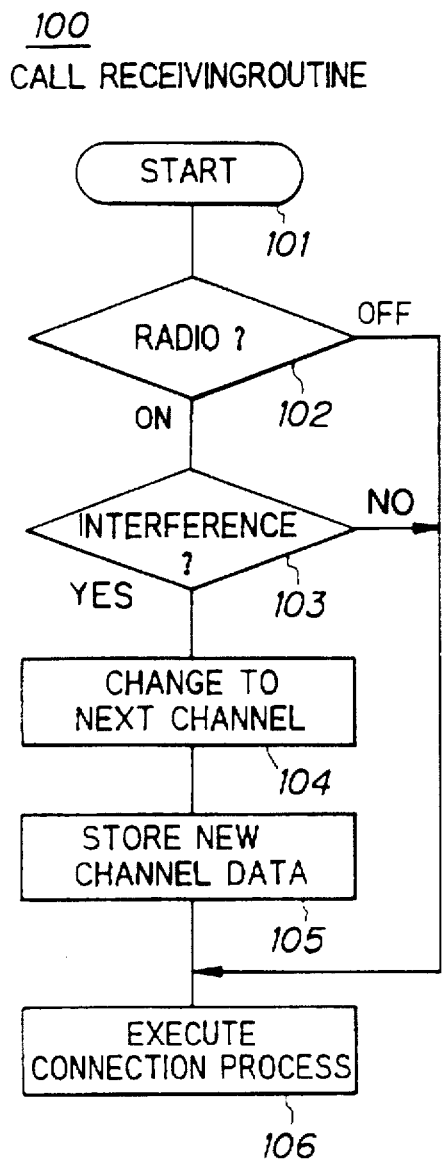
FIGS. 5A and 5B are flow charts for explaining process operations of the cordless telephone according to the second embodiment.
Figure 5B:
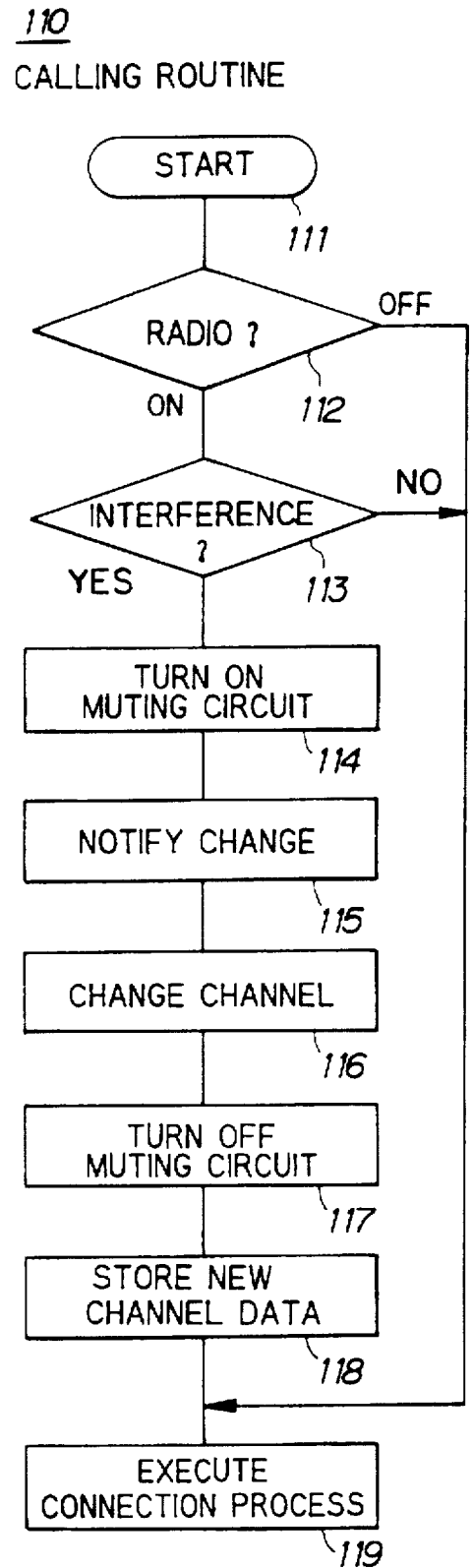

Furthermore, the system controller 30 is connected via a port to the reception controlling controller 80 in order to access the data between these controllers. In a ROM of the system controller 30, routines 100 and 110 as indicated in, for instance, FIGS. 5A and 5B, are prepared as a portion of a program executed by a control unit functioning as a CPU. It should be understood that although the cordless telephone unit 20 is arranged in a similar manner to that of the first embodiment shown in FIG. 3, no AND circuit 32 is employed. It should also be noted that a memory for storing therein the data about the frequency of the channel used between the child unit 2 and the mother unit 1 in the latest operation is employed in either the system controller 30, or the reception controlling controller 80.

In the cordless telephone with such an arrangement, when the key 31 is operated, the frequency dividing ratio N of the frequency dividing circuit 72 is controlled in accordance with the operated key 31 under control of the reception controlling controller 80. Thus either the reception mode, or the reception frequency "$f_{RX}$" corresponding to the operated key is set to the FM receiver unit 60.

Every time the reception frequency "$f_{RX}$" is changed, the data indicative of such a frequency dividing ratio N set to the frequency dividing circuit 72 is notified from the reception controlling controller 80 to the system controller 30. As a consequence, the system controller 30 can recognize the present reception frequency "$f_{RX}$" based upon the above-explained equation (3) and the data about the frequency dividing ratio N notified from the reception controlling controller 80.

When a telephone call is received in the waiting mode, the telephone call is sensed by the cordless telephone unit 20 and also such a notification "a telephone call is received" is sent to the system controller 30. As a result, the system controller 30 executes the routine 100 indicated in FIG. 5A.

That is, upon receipt of the telephone call, the process operation of the control unit in the system controller 30 starts from a step 101 of the routine 100. At the next step 102, a judgment is made as to whether or not the FM receiver unit 60 is under a reception condition of the FM broadcasting channel. When it is so judged that the FM receiver unit 60 is not yet under a reception condition of the FM broadcasting channel, this process operation is advanced from the step 102 to a step S106. At this step S106, the connection process between the mother unit 1 and the child unit 2 is executed with respect to the telephone call reception. As a result, both the mother unit 1 and the child unit 2 are brought into the telephone communication mode, so that the user of the child unit 2 can make a telephone conversation with the counter party.

To the contrary, when it is so judged at the step 102 that the FM receiver unit 60 is under a reception condition of the FM broadcasting channel, the process operation is advanced from this step 102 to a step 103. At this step 103, the last channel data is read out from the memory of either the system controller 30, or the reception controlling controller 80, namely the data related to the channel used between the mother unit 1 and the child unit 2 during the last telephone communication. A check is done as to whether or not the last channel may give the spurious interference to the present reception frequency "$f_{RX}$" of the receiver unit 60.

When it is so judged that the frequency of the last channel gives no spurious interference, the process operation is advanced from the step 103 to a step 106. At this step 106, the connection process is executed between the mother unit 1 and the child unit 2 in a similar manner to the above manner, and subsequently the operation mode is changed into the telephone communication mode.

On the other hand, when it is so checked that the last channel owns such a frequency giving the spurious interference to the present reception frequency "$f_{RX}$" of the FM receiver unit 60, the process operation is advanced from the step 103 to a step 104. At this step 104, the channel used in the cordless telephone unit 20 is changed into the next channel, namely the channel which does not give any spurious interference to the present reception frequency "$f_{RX}$" of the FM receiver unit 60. Subsequently, at a step 105, either the channel newly set at the step 104, or the data related to the new channel is stored as a last channel into the memory (not shown in detail) employed in either the system controller 30, or the receiving controlling controller 80. It should be understood that either this channel or the data related to this channel stored in the memory will be used in the step 103 when another telephone call is subsequently received, or issued.

The process operation is advanced to a step 106. As a result, at this step 106, the connection process is carried out by using the channel newly set at the step 104, and then the operation mode is changed into the telephone communication mode.

As previously explained, when the telephone call is received, the mother unit 1 is connected to the child unit 2, while using such a channel giving no spurious interference to the FM broadcasting channel.

On the other hand, when a telephone call is requested from the child unit 2 in the waiting mode, this call request is sensed by the cordless telephone unit 20, and the sensed result to the system controller 30. Then, in this systems controller 30, the routine 110 shown in FIG. 5B is executed.

That is, upon receipt of the telephone call request, the process operation of the control unit in the system controller 30 starts from a step 111 of the routine 110. At the next step 112, a judgment is made as to whether or not the FM receiver unit 60 is under a reception condition of the FM broadcasting channel. When it is so judged at this step 112 that the FM receiver unit 60 is not yet under a reception condition of the FM broadcasting channel, this process operation is advanced from the step 112 to a step S119. At this step S119, the connection process between the mother unit 1 and the child unit 2 is executed with respect to the telephone call request. As a result, the child unit 2 is connected via the mother unit 1 to the telephone line LN, the user of the child unit 2 dials his desirable telephone number, and thereafter, the user of the child unit 2 can make a telephone conversation with the counter party.

To the contrary, when it is so judged at the step 112 that the FM receiver unit 60 is under reception condition of the FM broadcasting channel, the process operation is advanced from this step 112 to a step 113. At this step 113, the last channel data is read out from the memory of either the system controller 30, or the reception controlling controller 80, namely the data related to the channel used between the mother unit 1 and the child unit 2 during the last telephone communication. A check is done as to whether or not the last channel may give the spurious interference to the present reception frequency "$f_{RX}$" of the receiver unit 60.

When it is so judged that the frequency of this last channel gives no spurious interference, the process operation is advanced from the step 113 to a step 119. At this step 119, the connection process is executed between the mother unit 1 and the child unit 2 in a similar case that the FM receiver unit 60 is not brought into the reception condition. Subsequently, the user of the child unit 2 can establish a telephone conversation with the counter party by dialing his desirable telephone number via the mother unit 1.

On the other hand, when it is so checked at the step 113 that the last channel has such a frequency giving the spurious interference to the present reception frequency "$f_{RX}$" of the FM receiver unit 60, the process operation is advanced from the step 113 to a step 114. At this step 114, the control signal is supplied to the muting circuit 67, so that the muting operation by the muting circuit 67 is once turned ON, and thus, the audio signal demodulated by the demodulator circuit 66 is muted.

Subsequently, the process operation is advanced to a step 115. At this step 115, the last channel is directly used by the child unit 2, and an instruction is made that the subsequently used channel is changed into the next channel. At the next step 116, the channel used in the cordless telephone unit 20 is changed into the new channel (otherwise, next channel) instructed to the child unit 2 at the step 115 in response to the control signal supplied from the system controller 30. In other words, this new (next) channel does not cause any spurious interference to the present reception frequency at the receiver unit 60.

At the subsequent step 117, the muting operation of the muting circuit 67 is turned OFF, and the demodulated audio signal is again supplied to the speaker 15. Subsequently, at a step 118, the new channel set at the step 116 is stored as the last channel into the memory employed in the reception controlling controller 80 or the system controller 30. As previously described, this channel stored in the memory is used at the step 103 or the step 113 when another telephone call is received or issued.

Then, the process operation is advanced to a step 119. At the step 119, the connection process is executed by using the channel instructed to the child unit 1 at the step 115, namely the channel newly set at the step 116, so that the user of the child unit 2 may dial his desirable telephone number and make a telephone communication with the counter party through the mother unit 1.

As a consequence, also when the telephone call is issued, the child unit 2 can be connected to the mother unit 1 while using such a channel giving no spurious interference to the FM broadcasting channel under reception by the FM receiver unit 60.

In accordance with the second embodiment, when the telephone call is issued from the child unit 1, the FM broadcasting signal can be reproduced by the speaker 15 while continuing the telephone conversation by the child unit 1 without muting the demodulated audio signal of the FM broadcasting channel under reception, except for such a period defined from the step 114 to the step 117.

According to the present invention, a telephone call either issued or received can result in a telephone conversation being carried out, even if the receiver unit is adversely influenced by the spurious interference caused by the spurious waves of the DOWN-channel FM signal since the muting circuit carries out the muting operation to the receiver unit and or the UP-channel FM signal, no interference sound is reproduced from the speaker.

In the case that the cordless telephone is used beside the bed, the child unit thereof is operated near the mother unit. During the telephone conversation, since the signal reception by the receiver unit is muted, no voice is reproduced from the speaker, which never gives any interference to the telephone conversation. Furthermore, the muting circuit may be substituted by the other circuit for limiting the noise between the FM broadcasting channels, resulting in low cost.

The present invention is not limited to the above-described embodiments, but may be changed or modified without departing from the technical scope of the present invention. As previously described in connection with the second embodiment, when it is so judge that the spurious interference is given to the frequency of the FM broadcasting signal under reception by the receiver unit, the muting operation by the muting circuit is once operated to mute the demodulated audio signal. After the channel between the child unit and the mother unit is changed, the muting operation by the muting circuit is turned OFF. The present invention is not limited to the above operation. For instance, similar to the first embodiment, when it is so judged that the spurious interference is given to the frequency of the FM broadcasting signal under reception by the receiver unit, the muting circuit may be brought into the ON state so as to mute the demodulated audio signal until the telephone conversation by the child unit via the mother unit is completed. In this case, when this telephone conversation is ended, the muting operation by the muting circuit is released, so that the received FM broadcasting program is outputted.

What is claimed is:

1. A telephone comprising:
  a child unit; and
  a mother unit for transmitting and receiving a telephone signal in a wireless mode to and from said child unit, said mother unit including:
    first transmission/reception means for receiving an UP-channel signal from said child unit and for transmitting said received UP-channel signal to a telephone line;
    second transmission/reception means for receiving a signal transmitted via said telephone line from a called party and for converting said received signal transmitted from said called party into a DOWN-channel signal to be transmitted to said child unit;
    radio receiving means for receiving a radio broadcasting signal;
    muting means for muting said radio broadcasting signal when one of said UP-channel signal and said DOWN-channel signal produces spurious interference to said radio receiving means;
    a power supply;
    control means for producing a transmission control signal and a hook signal;
    a switching transistor connected in series between said power supply and a power supply line of said second transmission/reception means wherein said switching transistor is switched by said transmission control signal; and
    an AND gate having as input signals said transmission control signal and said hook signal, wherein said output of said AND gate controls said muting means.

2. A telephone as claimed in claim 1, wherein said mother unit further comprises control means for controlling said first and second transmission/reception means, wherein when one of said UP-channel and said DOWN-channel is changed into a channel producing said spurious interference to said radio receiving means, said channel is changed to a different one where said spurious interference is not produced.

3. The telephone as claimed in claim 1, wherein:
  said radio receiving means is a synthesizer type receiver circuit; and
  said mother unit further comprises control means for controlling said first and second transmission/reception means, wherein said control means receives information related to a reception frequency from said radio receiving means and controls said first and second transmission/reception means based on whether said DOWN-channel of said second transmission/reception means produces said spurious interference to said radio receiving means at said reception frequency, and wherein said control means changes said DOWN-channel of said second transmission/reception means into a channel producing no interference to said radio receiving means when said DOWN-channel produces said spurious interference to said radio receiving means.

4. A telephone as claimed in claim 3, wherein said mother unit further comprises memory means for storing therein information related to a channel frequency used to transmit and receive said telephone signal between said mother unit and said child unit, and wherein said control means judges whether said DOWN-channel of said second transmission/ reception means produces said spurious interference to said radio receiving means based on a combination of said information related to said channel frequency stored in said memory means and said information related to said reception frequency supplied from said radio receiving means.

5. A cordless telephone comprising:

a child unit; and a mother unit for transmitting and receiving a telephone signal in a wireless mode to and from said child unit, said mother unit includes:

a transmission/reception unit for transmitting and receiving said telephone signal between said mother unit and said child unit using a plurality of channels;

an FM synthesizer type tuner unit for receiving an FM broadcasting program;

muting means for muting said FM broadcasting program; and control means for controlling said muting means to mute said FM broadcasting program when said transmission/reception unit transmits and receives said telephone signal using a channel which produces spurious interference to said tuner unit, and wherein said control means controls said transmission/reception unit to change a channel of said transmission/reception unit into another channel which does not produce said spurious interference to said tuner unit.

6. A cordless telephone as claimed in claim 5, wherein said control means receives information related to a reception frequency from said tuner unit, and wherein said control means judges whether a channel of said transmission/reception unit produces said spurious interference to said tuner unit based upon said information related to said reception frequency supplied from said tuner unit, and controls said transmission/reception unit, said tuner unit, and said muting means by muting said FM broadcasting program while said channel is changed to another channel not producing said spurious interference to said tuner unit.

7. A cordless telephone as claimed in claim 6, wherein said mother unit further comprises memory means for storing therein information related to a channel frequency used to transmit and receive said telephone signal between said mother unit and said child unit, and wherein said control means judges whether said channel of said transmission/reception means produces said spurious interference to said tuner means based on a combination of said information related to said channel frequency stored in said memory means and said information related to said reception frequency supplied from said tuner means.

\* \* \* \* \*